L. F. WELSANDT.
BOLSTER ATTACHMENT.
APPLICATION FILED JULY 10, 1917.

1,260,109.

Patented Mar. 19, 1918.

WITNESSES
R. T. Hoge
L. Wilcox

INVENTOR
Louis F. Welsandt
BY Victor J. Evans
ATTORNEY

UNITED STATES PATENT OFFICE.

LOUIS F. WELSANDT, OF NEW ALBIN, IOWA.

BOLSTER ATTACHMENT.

1,260,109.　　　　　Specification of Letters Patent.　　Patented Mar. 19, 1918.

Application filed July 10, 1917. Serial No. 179,725.

*To all whom it may concern:*

Be it known that I, LOUIS F. WELSANDT, a citizen of the United States, residing at New Albin, in the county of Allamakee and State of Iowa, have invented new and useful Improvements in Bolster Attachments, of which the following is a specification.

This invention relates to wagon bolster attachments and it consists in the novel features hereinafter described and claimed.

An object of the invention is to provide an attachment of simple and durable structure adapted to be applied to the bolster of a wagon or sled for the purpose of preventing logs, poles or the like from slipping longitudinally across the bolster when the carrying vehicle is in motion.

With this object in view the attachment comprises a bar preferably in the form of angle irons having an upwardly disposed edge with yokes attached to the ends of the bar and adapted to straddle the upper portion of the bolster. When the attachment is in position the logs or poles rest upon the upper edge of the bar and consequently the said edge will enter the material of the logs or poles and restrain the same against longitudinal movement transversely of the bolster.

In the accompanying drawing:—

Figure 1:
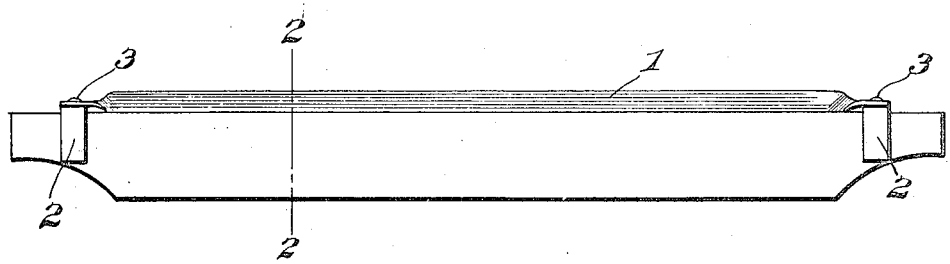
Figure 1 is a side elevation of a bolster showing the attachment applied.
Figure 2:
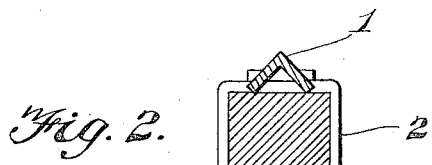
Fig. 2 is a transverse sectional view of the same cut on the line 2—2 of Fig. 1.
Figure 3:
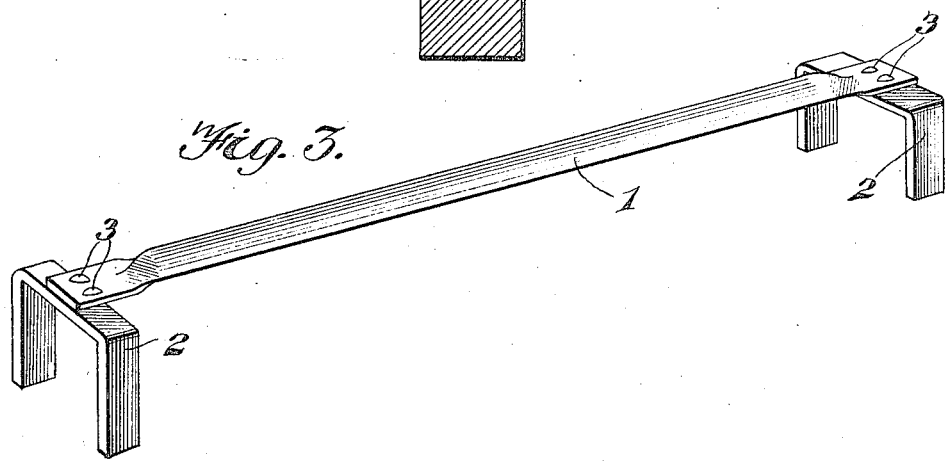
Fig. 3 is a perspective view of the bolster.

The bolster attachment comprises a bar 1 which is preferably formed from angle iron and which is adapted to rest at two of its edges upon the upper surface of a bolster. The said bar is flattened at its ends and yokes 2 are secured to the said flattened ends of the bar by means of rivets 3 or other suitable securing devices.

When the attachment is applied the yokes 2 straddle the upper portion of the bolster whereby the attachment is held in place upon the same and when the logs are positioned upon the bar 1 the upper edge or angle of the said bar will enter the material of the logs, poles or the like and restrain the same against longitudinal movement in a direction transversely of the bolster. Hence a simple and durable attachment is provided for effectually holding logs or poles in position upon the bolster of a wagon or sled while the same is in motion.

Having described the invention what is claimed is:—

1. A bolster attachment comprising a bar which is angular in transverse section and adapted to rest at two of its edges upon the bolster, said bar being flattened at its ends the said flattened ends lying in a plane above that in which the said edges lie and yokes carried at the flattened ends of the bar.

2. A bolster attachment comprising a bar which is angular in transverse section and adapted to rest at two of its edges upon the bolster with its third edge upwardly disposed and spaced from the bolster and yokes carried at the end portions of the bar.

In testimony whereof I affix my signature.

LOUIS F. WELSANDT.

Copies of this patent may be obtained for five cents each, by addressing the "Commissioner of Patents, Washington, D. C."